April 26, 1949.　　　　M. J. JOHNSON　　　　2,468,447
ELECTRIC MOTOR CONTROL SYSTEM
Filed May 29, 1943　　　　　　　　　　　　　2 Sheets-Sheet 1

INVENTOR
Manfred J. Johnson
BY
Johnson & Kline
ATTORNEYS

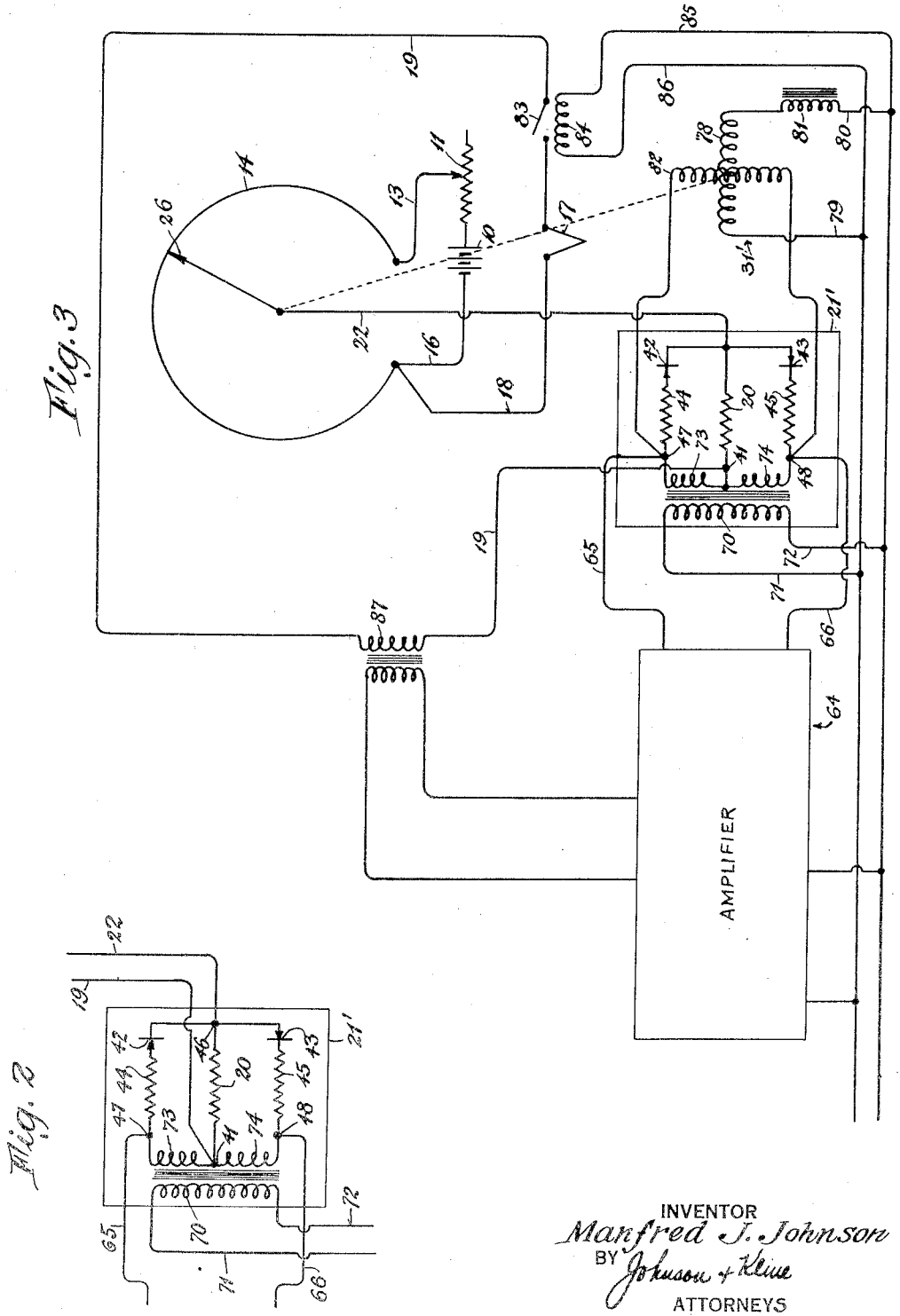

Patented Apr. 26, 1949

2,468,447

UNITED STATES PATENT OFFICE 2,468,447

ELECTRIC MOTOR CONTROL SYSTEM

Manfred J. Johnson, New Haven, Conn.

Application May 29, 1943, Serial No. 489,076

13 Claims. (Cl. 318—28)

This invention relates to a system and method for electrically measuring, recording and/or controlling the magnitude of a variable quantity or condition, and particularly to means for anticipating the balance point during the rebalancing operation.

Heretofore, efforts have been made in systems of this type to anticipate the balance point so as to avoid overthrow and prevent hunting around the balance point due to the inertia of the rebalancing means. One method of accomplishing this was to provide a direct current generator driven by the balancing motor and connected in the system so that a voltage generated during the balancing operation is fed into the detecting circuit including the unknown voltage controlled by the variable condition and the galvanometer so as to oppose the unknown voltage.

Since the generation of the voltage depends upon the speed of the balancing motor, the anticipation becomes a function of the speed of said motor and is ineffective, especially for small changes.

Another method of anticipating a balance point consists of using two relays and a double bridge network-slide wire so arranged that by opening and closing the relays the balancing action is stepped to the point of balance. This method, however, is cumbersome and slow and involves the use of time-delay interlocking relays resulting in a stepping rather than continuous action near the point of balance.

The present invention avoids the difficulties of the systems heretofore known by providing an anticipating means in which no relays, contacts or moving parts are used and in which the anticipating action is dependent upon the energization of but independent of the speed of the balancing means.

This is accomplished, according to the present invention, by including in the system an anticipating unit having a plurality of suitably arranged resistances and rectifiers interposed in the energizing circuit for the controlling field of the rebalancing motor and utilizing the difference of potential therein to produce a feedback into the detecting circuit. This feedback will be proportional to the amount of unbalance, especially near the balancing point, resulting in high speed balance up to within a fraction of 1% of the total scale travel at the balancing point.

The anticipating unit of the present invention may be used in connection with rebalancing motors of various types, for example, those having shaded pole windings which form the controlling field, or in two-phase motors where one phase provides the controlling field. Further, the detecting circuit may include a balance-indicating galvanometer and a circuit controlled thereby, or a chopper for the current in the circuit and the circuit inductively coupled to the motor circuit.

A feature of the invention resides in the independence of the anticipating circuit from the speed of the rebalance so that it is fully effective up to within a very small percentage of the balancing point, thus increasing the speed at which a balance may be achieved without the danger of overthrowing of the balancing means.

Another feature of the invention is that the potential drop across the drop resistor in the detecting circuit will always be of the correct polarity for the direction of balance either up scale or down scale.

Other features and advantages will be apparent from the specification when considered in connection with the drawings, in which:

Fig. 2 is another form of anticipating means.

Fig. 3 shows the anticipating means of Fig. 2 employed in a system having a two-phase motor and a detecting circuit without a galvanometer.

Figure 1:
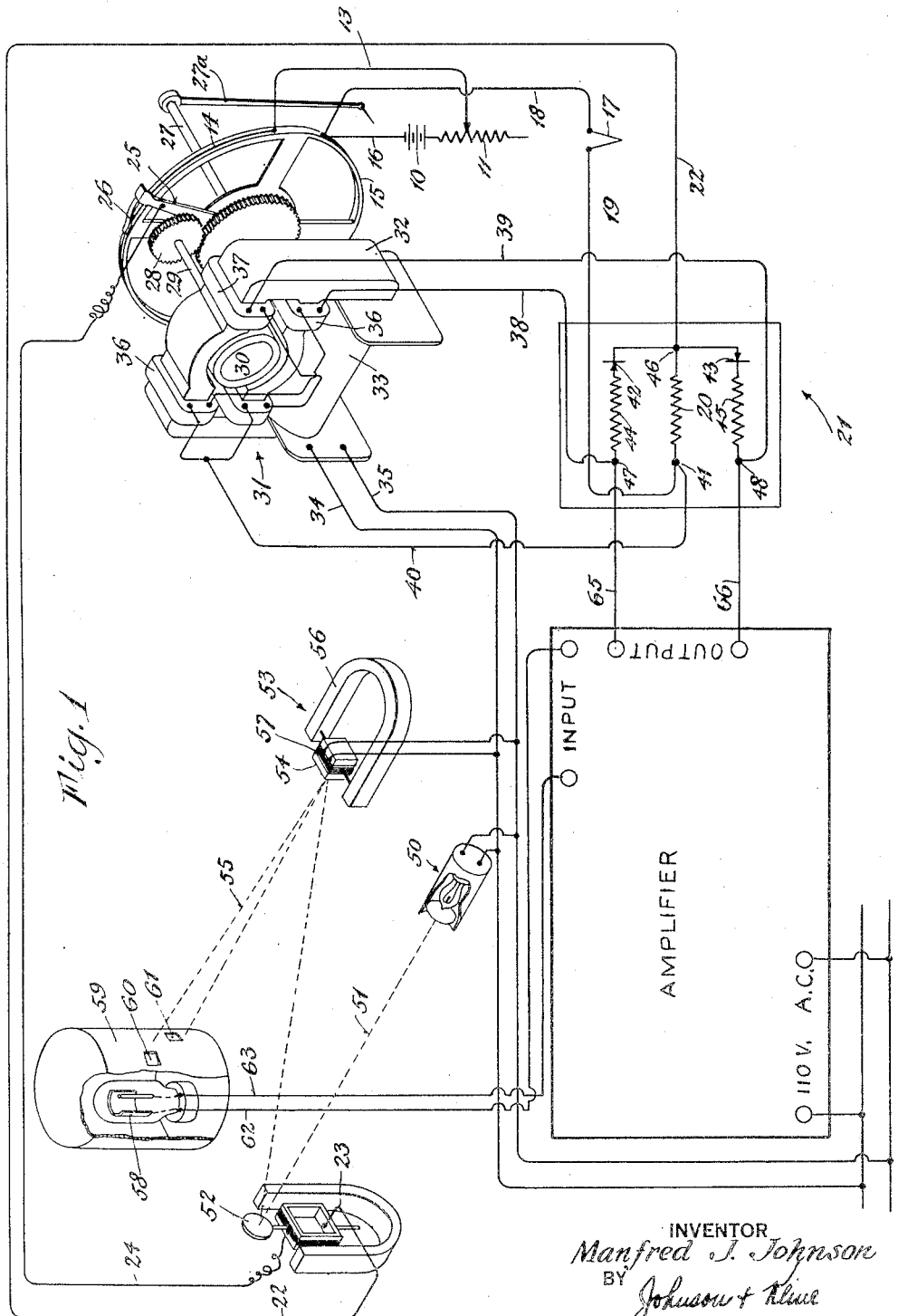
Figure 1 is a diagrammatical view showing the anticipating means in a light-beam operated system.

The present invention is diagrammatically shown in Fig. 1 as applied to a potentiometer system similar to that disclosed in my Patent No. 2,246,884, issued June 24, 1941, for measuring temperature.

The potentiometer circuit, which is used with a thermocouple or other source of voltage which is varied in accordance with a change of the condition being measured or controlled, includes a primary source of energy or battery 10 which has one terminal connected to a variable calibrating resistance 11. The other terminal of the variable resistance 11 is connected by a lead 13 to one end of a slide wire 14 mounted on the periphery of the stationary disk 15. The other end of the slide wire is connected by a lead 16 to the other terminal of the battery, thus completing the circuit.

A thermocouple 17 is included in the detecting circuit and operates to unbalance the circuit in response to a change in the condition. The thermocouple is connected by a lead 18 to the connection between the wire 14 and lead 16. The other terminal of the thermocouple is connected by lead 19 to a drop resistor 20 in the anticipator unit 21 through lead 22 to the galvanometer coil 23, from the galvanometer 23 through lead 24, to the movable arm 25 carrying the contact 26 engaging the wire 14, thus shunting the thermocouple circuit about a portion of the slide wire.

The movable arm 25 and contact 26, which are operated to effect a rebalance of the thermocouple circuit when changed from a normal condition, are mounted on a shaft 27 connected through gearing 28 to shaft 29 of the rotor 30 of a reversible motor 31. A recording pen or indicator 27a may be mounted on the shaft 27 as is usual.

The reversible motor may take various forms, but as illustrated in Fig. 1 it comprises a shaded pole motor having a pole piece 32 provided with portions encircling the armature and energized by a main field coil 33 connected by leads 34, 35 to the source of alternating current.

The control field comprises two pairs of wire-wound shading coils 36, mounted on the pole piece in diagonally opposite positions. The shading coils 36 and the shading coils 37 are each series-connected and the two sets of shading coils are connected in opposition so that when the main field coil is energized the voltages induced in each pair of coils will oppose one another so that there is no potential difference at the terminals.

The terminal of coils 36 is connected to the anticipating unit 21 by a lead 38 and the terminal of coils 37 is connected to the anticipating unit by lead 39. The midpoint of the connection between the two sets of shading coils is connected by a lead 40 to terminal 41 in the unit 21 at one side of the drop resistor 20.

When the detecting circuit becomes unbalanced and an input or controlling current is passed through the series-connected coils forming the control field in predetermined out-of-phase relation with the energization of the main field, they will coact with the main field to set up a rotating field having a direction of rotation determined by the displacement of the field set up by the coils, either leading or lagging with respect to the field set up by the main coil according to the direction of unbalance, and the rotor will turn in a corresponding direction to rebalance the circuit.

It has been found that, when this controlling current is supplied to the shading coils to produce a rotation of the rotor in a clockwise direction, the magnitude of the voltage existing between the leads 38 and 40 differs from the voltage between the leads 39, 40. For example, the voltage between the leads 38, 40 may be 10 volts and between leads 39, 40 may be 20 volts. If the controlling current produces rotation of the field in the opposite direction, the relative value of the voltage between the two sets of leads reverses.

This difference of voltage between the terminals of the controlling field is used to obtain an advancing E. M. F., which may be fed back into the thermocouple circuit in opposition to the voltage therein produced by the change in condition so as to anticipate a balance of the circuit thus stabilizing the system.

This is accomplished by the present invention by means of the anticipator unit 21, which includes the drop resistor 20 and two half-wave rectifiers, preferably of the dry disk type 42, 43, which are connected in opposition through appropriate resistors 44 and 45 to the leads 38 and 39 at terminals 47 and 48. The midpoint between the rectifiers is connected at 46 to the other end of the drop resistor 20, and, due to these connections, direct current will flow in the drop resistor 20 in the thermocouple circuit in opposition to the unbalance of current therein. The magnitude of the E. M. F. across the drop resistor will depend upon the amount of current input to the shading coils or controlling field as determined by the extent of unbalance and is independent of the speed of rotation of the motor.

In the form of the invention shown in Fig. 1, the input to the shading coils is obtained by means of a photoelectric system energized in accordance with the unbalance in the thermocouple circuit. In carrying out this control, a light source 50 is connected across the leads 33, 34 to the source of alternating current. The beam 51 of light 50 from the light source is directed against a mirror 52 carried by and movable with the galvanometer coil 23 which reflects the beam toward an oscillator 53 to impinge upon a mirrored surface 54 thereon and produce a sweeping beam 55.

The oscillator comprises a magnet 56 and a coil 57 connected across the leads 34, 35 and oscillates the beam of light in timed relation with the energization of the main field 33 of the motor.

The beam 55 is directed to the light-sensitive means shown as a photosensitive cell 58 which is shielded by a shield 59 having apertures 60, 61 therein. The beam normally sweeps over the shield between the apertures. Upon deflection of the beam caused by a change in the condition producing a deflection of the galvanometer, the beam will pass through aperture 60 or 61 and energize the photosensitive cell to produce a pulsating current having a predetermined phase relation to the energization of the main field of the motor and having a magnitude depending upon the amount of illumination of the cell 58.

The photocell 58 is connected by leads 62, 63 to an electronic amplifier 64, which steps up the pulsating current.

The amplifier is connected by leads 65, 66 to the terminals 47, 48 of the anticipator unit 21 and to the control field so that the input or controlling current is supplied thereto to cause the motor to rotate in the required direction to move the contact 26 on the slide wire to rebalance the detector or thermocouple circuit.

As noted above, the application of input current sets up a potential across the drop resistor 20 which produces the feedback current for the detector circuit. The magnitude of the E. M. F. across the drop resistor depends upon the amount of input current so that the anticipating or feedback current is a function of the unbalance.

This anticipating system is particularly advantageous when used with a detecting system having a galvanometer, for it makes the recording system controlled thereby proof against vibration. Heretofore, when a jar would knock the galvanometer system to cause a circuit to be closed or the light beam to enter one of the apertures, it would cause rotation of the motor and movement of the pen 27a. With the system of anticipation heretofore used, sufficient rotation of the motor was necessary to generate the back E. M. F. to counteract this so that substantial movement of the pen occurred. With the present system, however, the brief impulse produced by the light beam will be counteracted by the action of the anticipating means so that the detecting system will be balanced before the motor has had an opportunity to rotate and move the pen.

In some systems, if the motor does not have the wire-wound shading coils to supply the voltage drop across the terminals, the form of the invention shown in Fig. 2 may be used wherein a transformer having a primary 70 connected by lead 71, 72 to the source of alternating current has a pair of secondaries 73, 74 connected in opposition so that there is normally no voltage across the end thereof. These ends are connected to terminals 47 and 48 respectively to which the leads 65, 66 from the amplifier are also connected.

In this form of the invention, when the input is applied to the terminals 47, 48, the opposing secondaries, which have their midpoint connected at 41 to the drop resistor 20, will provide the E. M. F. to supply the proper anticipating current.

Such an anticipating means is shown in Fig. 3 as employed in a potentiometer system having a two-phase balancing motor and a simple detecting system which does not have a galvanometer or the like instrument in it.

In this form of the invention, the source of voltage is connected through a variable resistance 11 and lead 13 to one end of a resistor wire 14 and the other end of the wire is connected to the other terminal of the battery by a lead 16.

The detector system, including the thermocouple 17, is connected to the one end of the wire by lead 18 and the other terminal of the thermocouple is connected by a lead 19 to the point 41 in the anticipating device 21'. The terminal 46 is connected by lead 22 to the movable contact 26, thus completing the detecting circuit.

The movable contact 26 is driven by the motor 31', which is a two-phase motor, having one phase 78 connected by leads 79, 80 across the source of alternating current with an inductance or choke 81 disposed in the lead 80. The other phase 82, which is the controlling field, is connected to the terminals 47, 48, to which are also connected the secondaries 73, 74 of the transformer having the primary 70 connected across the lines by leads 71, 72.

When there is a variation from a normal condition, the thermocouple detects such variation and causes a current to flow in the detector circuit. A chopper, indicated by switch 83, in the detector circuit is operated by a coil 84 connected across the power source by leads 85, 86 to periodically open and close the switch to produce a pulsating current in the detecting circuit. The detecting circuit is inductively coupled at 87 to the amplifier 64 and current is amplified and fed to the anticipating device over leads 65, 66 which are also connected to terminals 47, 48 to supply the controlling field with the proper phase related current to cause rotation of the motor in one direction or the other to move the contact 26 to rebalance the circuit.

When the input current is applied to the field, the E. M. F. across the drop resistor 20 in the anticipating device will be proportional to the amount of unbalance and this will produce a feedback current in the detector circuit as before explained to anticipate the balance position and bring the system to a complete balance just before the contact 26 reaches balancing position, thereby preventing overrunning of the motor.

In the broader aspects of the invention, the present invention provides for producing an anticipating current in the detecting circuit in accordance with the energization of the rebalancing means and independently of the speed of rebalance for preventing overthrow or hunting of the rebalancing means when the balanced condition is reached.

While the invention herein has been described as applied to a potentiometer system, it may be used with any control or measuring or recording system of the type having a condition-responsive element in a detecting circuit for unbalancing said system in accordance with a change in condition, wherein the counteracting current may be produced and introduced in the detecting circuit, the counteracting current being in accordance with the energization of the rebalancing means and being independent of the speed thereof.

Variations and modifications may be made within the scope of this invention and portions of the improvements may be used without others.

I claim:

1. In a device of the class described, a balanced detecting circuit including a condition-responsive element for unbalancing the circuit in accordance with a change in condition and means for rebalancing said circuit; an amplifier connected to said detecting circuit; a motor having a main, continuously energized field connected across a source of energy and a controlling field separate from said main field and connected to the amplifier and energized in accordance with the amount and direction of unbalance of said circuit for operating said means to restore balance to the circuit; and means separate from the amplifier connected in said detecting circuit for feeding back a counteracting current to the detecting circuit to anticipate the balanced condition therein, said means including a network of resistors and rectifiers connected across the terminals of the controlling field of the motor and energized in accordance with the energization thereof whereby the feedback current is proportional to and in proper polarity with respect to the energization of the controlling field and independent of the speed of the motor.

2. In a device of the class described, a balanced detecting circuit including a condition-responsive element for unbalancing the circuit in accordance with a change in condition and means for rebalancing said circuit; an amplifier connected to said detecting circuit; a motor having a main energizing field connected across a source of energy and a separate controlling field connected to the amplifier and energized in accordance with the amount and direction of unbalance of said circuit for operating said means to restore balance to the circuit; means separate from the amplifier connected across the terminals of the controlling field of the motor and energized in accordance with the energization thereof for producing a potential difference which is proportional to and in proper polarity with respect to the energization of the controlling field and independent of the speed of the motor; and means for introducing said potential difference in said detecting circuit in opposition to the unbalance of the circuit to anticipate the balanced condition before the rebalancing means reaches rebalanced position.

3. In a device of the class described, a balanced detecting circuit including a condition-responsive element for unbalancing the circuit in accordance with a change in condition and means for rebalancing said circuit; an amplifier connected to said detecting circuit; a motor having a main energizing field connected across a source of energy and a separate controlling field connected to the amplifier and energized in accordance with the unbalance of said circuit for operating the means for rebalancing said circuit to restore balance thereto; and an anticipating unit separate from the amplifier connected in the controlling field circuit and having means therein for producing a potential difference proportional to and in predetermined polarity with respect to the energization of said controlling field and independently of the speed of the motor, said potential difference being introduced into the detecting circuit in opposition to the unbalance thereof to return the detecting circuit to balanced condition before said motor moves the means operated thereby to rebalancing position.

4. In a potentiometer system, a balanced detecting circuit including a thermocouple responsive to changes in a condition to unbalance the circuit and a slide wire unit having a movable contact for rebalancing said circuit; an amplifier connected to said detecting circuit; a motor having a main energizing field connected across a source of energy and a separate controlling field connected to the amplifier and energized in accordance with the amount and direction of unbalance of said circuit for moving the contact over the slide wire to restore balance to the circuit; and means separate from the amplifier connected in said detecting circuit for feeding back a counteracting current to anticipate a balanced condition before the contact is in balanced position, said means being connected across the terminals of the controlling field of the motor and energized in accordance with the energization thereof whereby the feedback current is proportional to and in proper polarity with respect to the unbalance of the detecting circuit and independent of the speed of the motor.

5. In a device of the class described, a balanced detecting circuit including a condition-responsive element for unbalancing the circuit in accordance with a change in condition and means for rebalancing said circuit; an amplifier connected to said detecting circuit; a motor having a main energizing field and a separate controlling field connected to the amplifier and comprising wound shading coils connected in opposition and energized in accordance with the unbalance of said circuit for operating the means for rebalancing said circuit to restore balance thereto; and means separate from the amplifier connected across the terminals of said opposed wound shading coils and having means therein in said detecting circuit for feeding back a counteracting current to anticipate a balanced condition, said means being energized by the difference in potential across said terminals when the controlling field is energized in accordance with the unbalance of the detecting circuit whereby the feedback current produced thereby is proportional to and in proper polarity with respect to the energization of the controlling field and independent of the speed of the motor.

6. In a device of the class described, a balanced detecting circuit including a condition-responsive means for unbalancing the circuit in accordance with a change in condition and means for rebalancing said circuit; a motor having a main energizing field connected across a source of energy and a separate controlling field energized in accordance with the unbalance of said detecting circuit for operating the means for rebalancing said circuit to restore balance thereto; and an anticipating unit including a transformer having a pair of secondary coils connected in opposition and connected across the controlling field circuit, a pair of half-wave rectifiers connected in opposition across the coils, and a drop resistor connected between the midpoint of the coils and the midpoint between the rectifiers and included in the detecting circuit, the difference in potential across the drop resistor when the field is energized supplying a counteracting current to the detecting circuit in accordance with the energization of said field and independently of the speed of the motor to return the detecting circuit to balanced condition before the motor returns the means operated thereby to rebalancing position.

7. In a device of the class described, a balanced detecting circuit including a condition-responsive element for unbalancing the circuit in accordance with a change in condition and means for rebalancing said circuit; an amplifier connected to said detecting circuit; a motor having a main energizing field connected across a source of energy and a separate controlling field connected to the amplifier and energized in accordance with the unbalance of said circuit for operating the means for rebalancing said circuit to restore balance thereto; and an anticipating unit separate from the amplifier connected in the controlling field circuit and including a pair of half-wave rectifiers connected in opposition and a drop resistor connected thereto and included in the detecting circuit to supply a counteracting current to the circuit in accordance with the energization of said field and independently of the speed of the motor to return the detecting circuit to balanced condition before said means is in rebalancing position.

8. In a device of the class described, a balanced detecting circuit including a condition-responsive element for unbalancing the circuit in accordance with a change in condition and means for rebalancing said circuit; a motor having a main energizing field connected across a source of energy and a separate controlling field comprising wound shading coils connected in opposition and energized in accordance with the unbalance of said circuit for operating the means for rebalancing said circuit to restore balance thereto; and anticipating means including half-wave rectifiers series-connected in opposition across the terminals of said opposed wound shading coils and a drop resistor connecting the midpoint of the opposed shading coils and the midpoint of the opposed rectifiers and being included in said detecting circuit, the potential drop across the drop resistor when the control field is energized producing a feedback current to oppose the unbalance in the detecting circuit to anticipate a balanced condition, the feedback current being proportional to and in proper polarity with respect to the energization of the controlling field and independent of the speed of the motor.

9. In a device of the class described, a balanced detecting circuit having means for unbalancing the circuit in response to a change in condition, a galvanometer movable from a neutral position in accordance with the unbalance of the circuit and a slide wire having a movable contact for rebalancing said circuit; an amplifier connected to said detecting circuit; a reversible motor connected to move the contact of the slide wire, said motor having a main energizing field connected across a source of energy and a separate controlling field connected to the amplifier and energized in accordance with the movement of the galvanometer from neutral to control the direction and extent of operation thereof to move the contact to rebalancing position and restore said detecting circuit to balanced condition; and an anticipating unit separate from the amplifier connected across the controlling field and having means to supply a counteracting current to the detecting circuit in accordance with the energization of said field and independently of the speed of the motor to return the galvanometer to neutral and the detecting circuit to balanced condition before said slide wire contact is in rebalancing position.

10. In a device of the class described, a balanced detecting circuit including a condition-responsive element for unbalancing the circuit in accordance with a change in condition and means for rebalancing said circuit; a two-phase motor having one phase continuously energized and the second phase thereof energized in accordance with the unbalance of said circuit for operating the means for rebalancing said circuit to restore balance thereto, the second phase constituting a controlling field; and means including a transformer having a pair of series-connected secondaries connected in opposition with their outer terminals connected across the controlling field and having means disposed in said detecting circuit for feeding back a counteracting current to anticipate a balanced condition, said means being energized by the difference in potential across said terminals when the controlling field is energized in accordance with the unbalance of the detecting circuit whereby the feedback current produced thereby is proportional to and in proper polarity with respect to the energization of the controlling field and independent of the speed of the motor.

11. In a device of the class described, a balanced detecting circuit having means for unbalancing the circuit in response to a change in condition, means for chopping the current therein, a slide wire having a movable contact for rebalancing said circuit; an amplifier connected to said detecting circuit; a reversible motor connected to move the contact of the slide wire, said motor having a main energizing field connected across a source of energy and a separate controlling field connected to the amplifier and energized by the chopped current in accordance with the direction and amount of unbalance thereof to move the contact to rebalancing position and restore said detecting circuit to balanced condition; and an anticipating unit separate from the amplifier connected across the controlling field and having means to supply a counteracting current to the detecting circuit in accordance with the energization of said field and independently of the speed of the motor to return the detecting circuit to balanced condition before said slide wire contact is in rebalancing position.

12. A device of the class described, a detecting circuit including a condition responsive element for unbalancing the circuit in accordance with a change in condition and means for rebalancing said circuit; a reversible motor energized in accordance with the amount and direction of the unbalance of said circuit for operating said means to restore balance to the circuit; and means connected in said detecting circuit for feeding back a counteracting current to the detecting circuit to anticipate the balanced condition therein, said means including a drop resistor connected across a pair of coils having normally balanced opposed induced voltages therein, the normally balanced opposed induced voltages being unbalanced in accordance with the energization of said motor to restore balance to the detecting circuit and producing a voltage drop across said resistor proportional to and in proper polarity with respect to the energization of said motor.

13. A device of the class described, a detecting circuit including a condition responsive element for unbalancing the circuit in accordance with a change in condition and means for rebalancing said circuit; a reversible motor energized in accordance with the amount and direction of the unbalance of said circuit for operating said means to restore balance to the circuit; and means connected in said detecting circuit for feeding back a counteracting current to the detecting circuit to anticipate the balanced condition therein, said means inluding a network of resistors and rectifiers connected across a pair of coils having normally balanced opposed induced voltages therein and impressed on the network, the normally balanced opposed induced voltages being unbalanced in accordance with the energization of said motor to restore balance to the detecting circuit and producing a feed back current proportional to and in proper polarity with respect to the energization of said motor.

MANFRED J. JOHNSON.

REFERENCES CITED

The following references are of record in the file of this patent:

UNITED STATES PATENTS

| Number | Name | Date |
|---|---|---|
| 1,554,698 | Alexanderson | Sept. 22, 1925 |
| 2,025,749 | Hubbard | Dec. 31, 1935 |
| 2,109,222 | Ryder | Feb. 22, 1938 |
| 2,113,436 | Williams, Jr. | Apr. 5, 1938 |
| 2,325,801 | Razek | Aug. 3, 1943 |